United States Patent
Meicke et al.

(10) Patent No.: US 6,179,510 B1
(45) Date of Patent: Jan. 30, 2001

(54) RAPID CONNECT/DISCONNECT SYSTEM

(75) Inventors: Raymond J. Meicke, Bixby; Darrel G. McCaslin, Mounds, both of OK (US)

(73) Assignee: Cobra Manufacturing Co., Inc., Bixby, OK (US)

(*) Notice: Under 35 U.S.C. 154(b), the term of this patent shall be extended for 0 days.

(21) Appl. No.: 09/008,197

(22) Filed: Jan. 15, 1998

Related U.S. Application Data

(60) Provisional application No. 60/035,527, filed on Jan. 16, 1997.

(51) Int. Cl.[7] .................................................... F41B 5/20
(52) U.S. Cl. ........................ 403/306; 403/256; 403/254; 124/86
(58) Field of Search .................................... 403/306, 230, 403/256, 257, 259, 252, 254; 124/86, 87, 88, 89, 23.1; 33/265; 411/537, 538

(56) References Cited

U.S. PATENT DOCUMENTS

| | | | |
|---|---|---|---|
| 2,705,574 | * | 4/1955 | Schoessow et al. ................. 411/537 |
| 3,524,441 | * | 8/1970 | Jeffery .................................... 124/24 |
| 4,261,665 | * | 4/1981 | Hsiung ................................. 403/231 |
| 4,783,189 | * | 11/1988 | Bugg ..................................... 403/264 |
| 5,513,622 | * | 5/1996 | Musacchia ............................. 124/89 |
| 5,520,164 | * | 5/1996 | Huddleston ............................ 124/86 |
| 5,558,078 | * | 9/1996 | Dunlap ................................... 124/86 |
| 5,687,527 | * | 11/1997 | Bikard et al. ......................... 403/230 |

OTHER PUBLICATIONS

*Archery Catalogue'*96/97, Jan van Drunen, Bogencentrum BV, The Netherlands, p. 43.
1998 *Hunting & Target Product Catalog,* Specialty Archery Products, Clear Lake, IA, p. 16.

* cited by examiner

*Primary Examiner*—Lynne H. Browne
*Assistant Examiner*—John R. Cottingham
(74) *Attorney, Agent, or Firm*—Fellers, Snider, Blankenship, Bailey & Tippens, P.C.

(57) ABSTRACT

A rapid connect/disconnect system including a base mount, key pin, beveled washer, nut and mounting stud. This rapid connect/disconnect system can be used to secure two members together in a wide variety of applications where rapid connection and/or disconnection of the two members is desired. The base mount is secured to one member while the key pin, beveled washer, nut and mounting stud are secured to the second member. The nut and the key pin are threaded onto the mounting stud and the beveled washer is inserted onto the mounting stud between the nut and the key pin. A keyed socket is machined into the base mount to receive the mounting stud and key pin. From connection of the system, the key pin on the mounting stud is inserted into the keyed socket and the mounting stud rotated such that the key pin is threaded toward the nut along the length of the mounting stud. The mounting stud is rotated until the base mount is secured against the washer and the washer is tightened against the nut thereby securing the key pin within the keyed socket of the base mount.

5 Claims, 3 Drawing Sheets

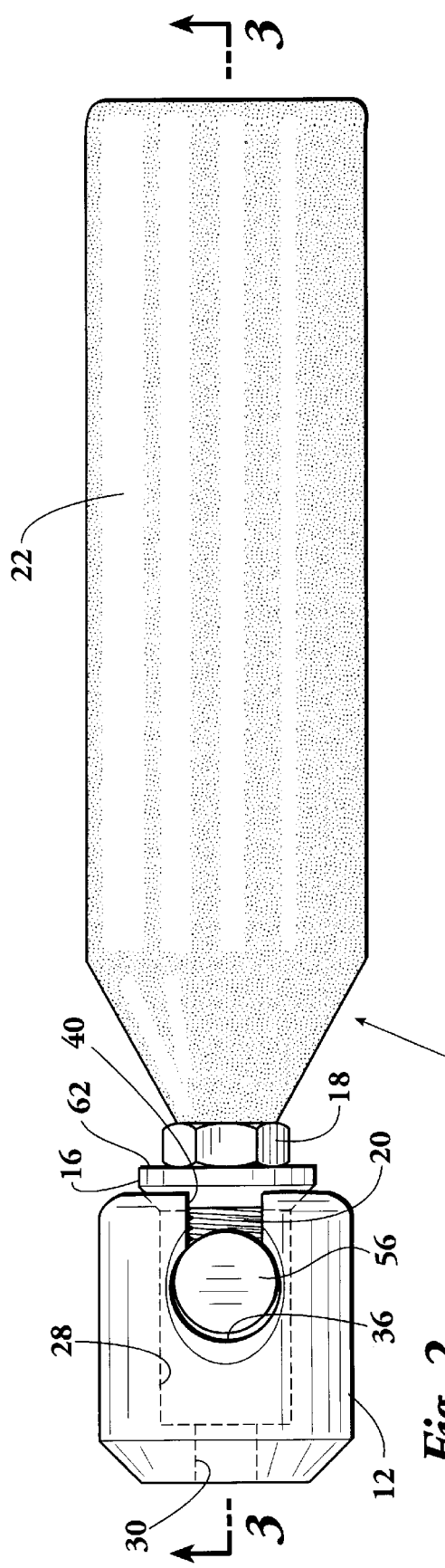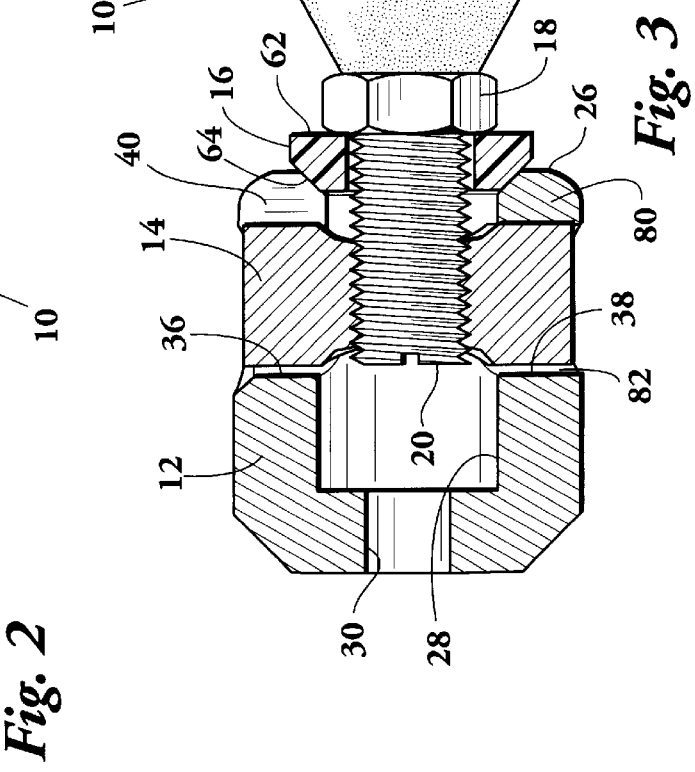
Fig. 2
Fig. 3

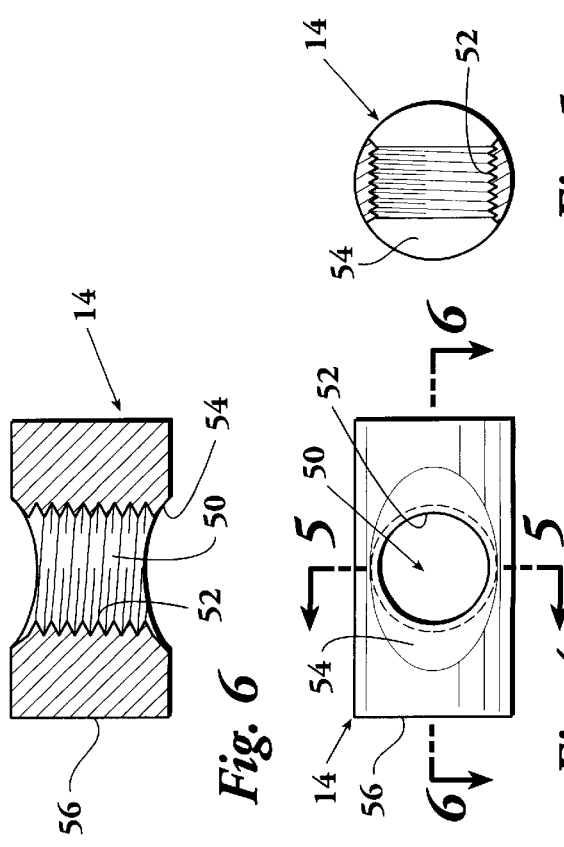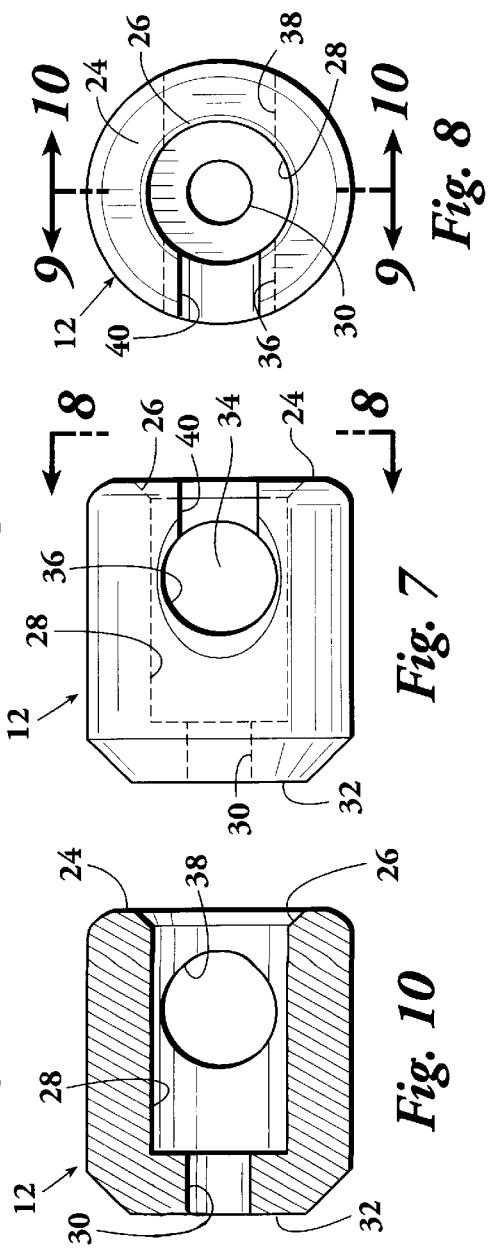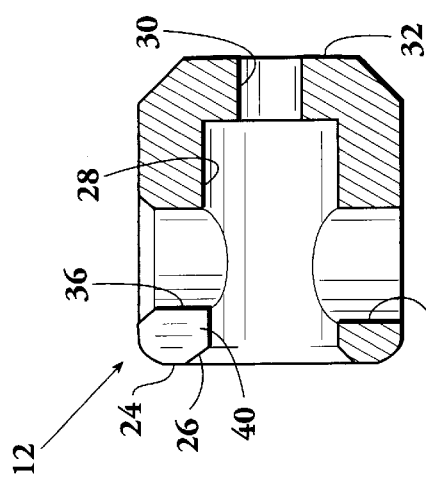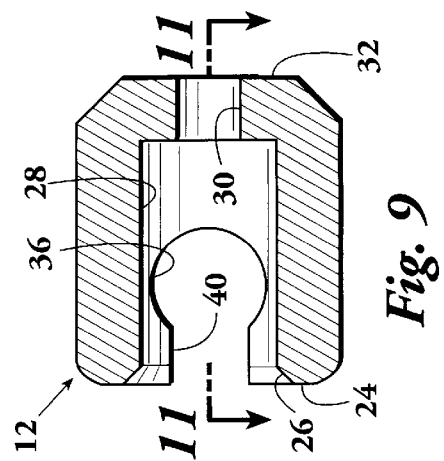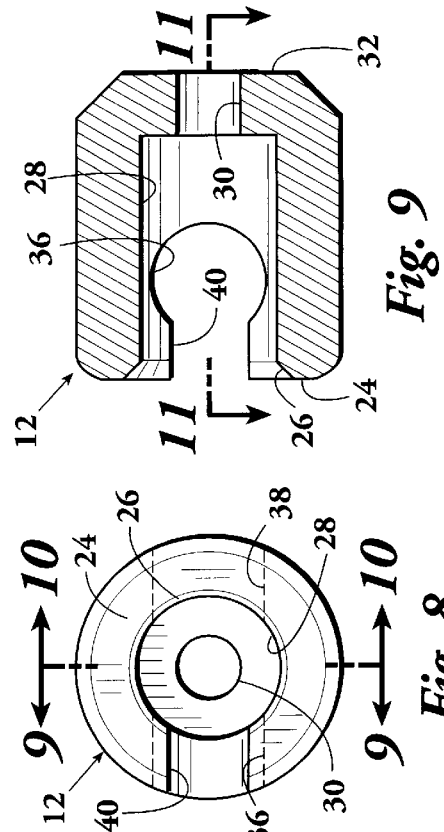

US 6,179,510 B1

RAPID CONNECT/DISCONNECT SYSTEM

This application claims the benefit of the following: U.S. Provisional Application No. 60/035,527, filed Jan. 16, 1997.

BACKGROUND OF THE INVENTION

This invention relates to devices for rapid connection/disconnection of one member to another. The invention particularly relates to a rapid connect/disconnect system to quickly secure and remove archery accessories from a bow.

Archery accessories, such as quivers, stabilizers, and archer sights, are commonly attached to archery bows for convenience and to assist the archer in accuracy. Such accessories have traditionally included a threaded portion which threads into a mating threaded slot in the archery bow. Modern archery bows are most commonly compound bows which provide an enormous amount of force as the arrow is released. The large amount of shock or impulse force on the archery bow when the string is released by the archer is transmitted to the archery accessories attached to the bow. This force commonly causes the accessory to loosen and decreases accuracy when the accessory is an archery sight. For this reason, the threaded portions which fix archery accessories to the archery bow are generally long enough so that when tightly screwed onto the bow, this threaded fit will resist the vibration forces when the string is released. A result of the length of the threaded portion fixing the accessory to the archery bow requires that the accessory be rotated many revolutions in order to detach the accessory from the bow and then requires a similar number of rotations in the opposite direction to again secure the accessory to the bow.

It is desirable for many reasons to attach and detach archery accessories from the bow. For example, archers frequently detach accessories from the bow for transport and storage so that the bow can be maneuvered and stored more easily. Additionally, it is desirable to detach accessories from the bow during transport to reduce the possibility of damage to the accessory or the bow. In addition, cases and covers for archery bows frequently do not provide room for covering the archery bow with the accessory attached, necessitating the removal of the accessory. Furthermore, many states require that archery accessories be removed from the archery bow during transport and storage of the bow. A need for a rapid connect/disconnect to quickly and easily secure an archery accessory to an archery bow which alternately quickly and easily detaches exists in the archery industry.

In addition, a general need exists for a system which allows quick and easy attachment of one member to another so that the members are held in their connected position against unintentional release, which also provides for quick and easy disconnect of the members when desired.

SUMMARY OF THE INVENTION

The present invention is a system which allows for rapid connection and disconnection of two members, such as, for example, an archery accessory and an archery bow. According to the present invention, a rapid connect/disconnect system includes a base mount, key pin, beveled washer, nut and mounting stud. This rapid connect/disconnect system can be used to secure two members together in a wide variety of applications where rapid connection and/or disconnection of the two members is desired.

In this invention, the base mount is secured to one member, such as an archery bow, while the key pin, beveled washer, nut and mounting stud are secured to the second member, such as an archery stabilizer. The nut and the key pin are threaded onto the mounting stud such that there exist a length of the threaded mounting stud between the nut and the key pin. The beveled washer is inserted onto the mounting stud between the nut and key pin. The nut is threaded onto the mounting stud against the second member (stabilizer) to provide a base against which the system is tightly threaded. The beveled washer is flat on one side and includes a beveled surface opposite the flat side. The beveled washer is installed onto the stud such that its flat side rests against the nut and the beveled surface is extending toward the key pin. The beveled surface of the beveled washer mates a bevel machined in the base mount and assists to properly align the stud and thereby the key pin within the base mount.

A keyed socket is machined into the base mount which includes a channel, socket, and a key receiver. A neck is cut into the base mount into the socket to provide open communication through the base mount into the channel to receive the key pin. As stated, a bevel is machined into the base mount to facilitate the insertion of the key pin into the socket. The key receiver is drilled through the wall of the base mount and is of a size slightly larger than the size of the key pin so as to receive an end of the key pin.

The key pin is threaded onto the mounting stud so that its longitudinal axis is perpendicular to the longitudinal axis of the mounting stud. Upon connection of the system, the key pin on the mounting stud is inserted into the channel of the base mount past the neck and into the socket. Once the key pin is inserted into the socket, one end of the key pin is slid through the channel and into the key receiver. The mounting stud which is fixed into the second member (archery stabilizer) is rotated so that the key pin is threaded toward the nut along the length of the mounting stud. The beveled surface of the beveled washer then properly aligns the key pin into the keyed socket and seats into the bevel machined into the base mount. The mounting stud is rotated until the beveled surface of the beveled washer is tightened against the bevel of the base mount and the flat surface of the beveled washer is tightened against the nut. The end of the key pin extending into the key receiver of the base mount insures that the base mount remains tightly secured against the beveled washer so that the first member (archery bow) and the second member (archery stabilizer) remain securely connected together.

In order to disconnect the system, the mounting stud is rotated in the opposite direction such that the key is threaded away from the nut along the length of the mounting stud. The key is then removed from the keyed socket of the base mount. The second member (archery stabilizer) is thereby disconnected from the first member (archery bow).

It is an object of the present invention to provide a connect/disconnect system to allow rapid connection and/or disconnection of one member to another.

It is a further object of the present invention to provide a system for connection (or disconnection) of an archery accessory to an archery bow capable of withstanding the impuse/vibrational forces resulting from use of the bow.

A still further object of the present invention is to provide a system which allows the archer accessory to be rapidly and easily connected or disconnected to the archery bow.

BRIEF DESCRIPTION OF THE DRAWINGS

FIG. 2 is a side view of the rapid connect/disconnect system of the present invention employed on a stabilizer for an archery bow.

FIG. 3 is a view of the rapid connect/disconnect system of the present invention taken along line 3—3 of FIG. 2.

FIG. 4 is a top view of the key pin of the rapid connect/disconnect system of the present invention.

FIG. 5 is a view taken along line 5—5 of FIG. 4.

FIG. 6 is a view taken along line 6—6 of FIG. 4.

FIG. 7 is a side view of the base mount of the rapid connect/disconnect system of the present invention.

FIG. 8 is a bottom view of the base mount taken along line 8—8 of FIG. 7.

FIG. 9 is a view taken along line 9—9 of FIG. 8.

FIG. 10 is a view taken along line 10—10 of FIG. 8.

FIG. 11 is a view taken along line 11—11 of FIG. 9.

DETAILED DESCRIPTION OF THE PREFERRED EMBODIMENT

Figure 1:
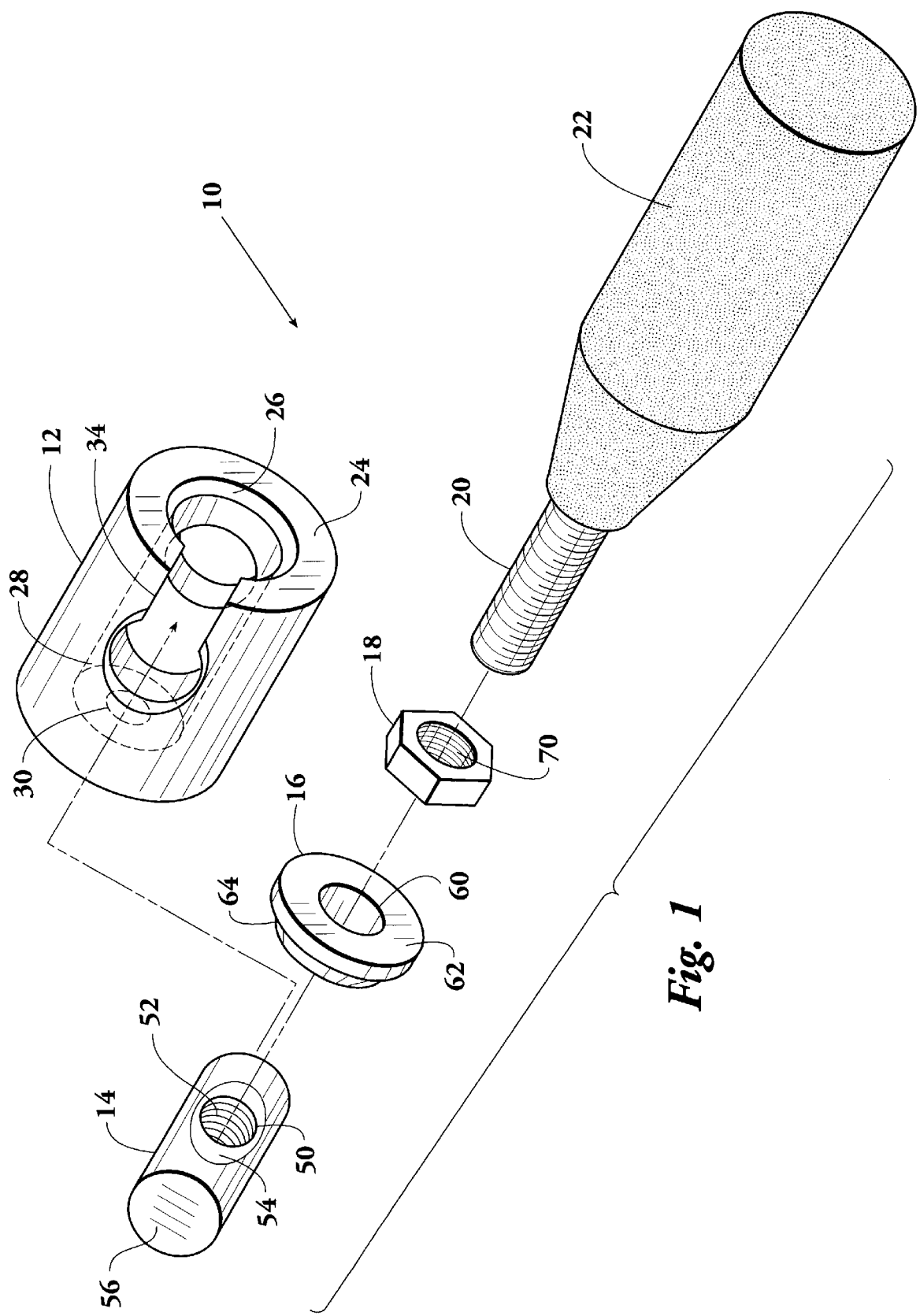
FIG. 1 is an exploded isometric view of the rapid connect/disconnect system of the present invention employed on a stabilizer for an archery bow.

Attention will first be directed to an embodiment of a system which provides means for rapid connection and disconnection of two members. This system is particularly useful for the rapid connection/disconnection of an archery accessory to a bow.

FIG. 1 shows the rapid connection/disconnection system 10 of the present invention including a base mount 12, key pin 14, beveled washer 16, nut 18, and mounting stud 20. Rapid connect/disconnect system 10 can be used to secure two members together in a wide variety of applications where rapid connection/disconnection of the two members is desired. It has been found, however, that rapid connect/disconnect system 10 is particularly suitable for securing an archery accessory to a bow. For the purpose of exemplification herein, rapid connect/disconnect system 10 is employed in a stabilizer 22 and used to secure the stabilizer 22 to an archery bow (not shown). Stabilizers such as stabilizer 22 are known in the art and used to dampen the force of releasing the bowstring to launch an arrow. Rapid connect/disconnect system 10 allows stabilizer 22 to be secured to an archery bow for target shooting or hunting and then rapidly and easily removed for storage and/or transport.

Nut 18 of rapid connect/disconnect system 10 is threaded onto mounting stud 20 in order to provide a base against which key pin 14 may be tightly threaded. Beveled washer 16 is placed on mounting stud 20 between nut 18 and key pin 14. Beveled washer 16 contacts the bottom surface 24 of base mount 12. Key pin 14 is threaded onto mounting stud 20 thereby retaining beveled washer 16 onto mounting stud 20 between nut 18 and key pin 14.

FIG. 4 is a top view of key pin 14 of the present invention. A stud aperture 50 is drilled and tapped through key pin 14. In the preferred embodiment, the center line of stud aperture 50 substantially bisects the longitudinal axis of key pin 14, however, stud aperture 50 could be drilled at other points along the length of key pin 14 in alternate embodiments. Stud aperture 50 is tapped so as to mate the thread pitch of mounting stud 20 of FIG. 1. In the preferred embodiment, stud aperture 50 is tapped, and mounting stud 20 includes a standard Archery Manufacturers & Merchants Association (AMO) thread pitch for archery accessories; however, other mating thread pitches are equally suitable. A bevel 54 may be machined into key pin 14 to facilitate threading of key pin 14 onto mounting stud 20 (of FIG. 1).

FIG. 5 is a view taken along line 5—5 of FIG. 4 showing the annular geometry of key pin 14. FIG. 5 further shows threads 52 of stud aperture 50 as well as bevel 54.

FIG. 6 is a cross-sectional view taken along the line 6—6 of FIG. 4 depicting the placement of stud aperture 50 along the length of key pin 14.

Base mount 12 includes a keyed socket 34 therein into which key pin 14 is inserted. The shape of keyed socket 28 mates the shape of key pin 14.

Referring now to FIG. 7, a side view of base mount 12, it can be seen that an interior channel 28 is machined into base mount 12. Channel 28 is machined through the bottom surface 24 of base mount 12 and extends into base mount 12 a sufficient depth to allow keyed socket 34 to be machined into base mount 12. An annular passage 30, shown in phantom, is drilled through the top 32 of base mount 12 into channel 28. The purpose of passage 30 is to receive a fastener, such as a screw used to secure base mount 12 to an object as desired. In this preferred embodiment, a socket head cap screw (not shown) is inserted into channel 28 through passage 30 and threaded into an archery bow which is drilled and tapped to receive the socket head cap screw. The thread pitch of the socket head cap screw mates the threads of the archery bow. This thread pitch is preferably a standard pitch known in the industry such as defined by the Archery Manufacturer's & Merchant's Association (AMO). In this manner, base mount 12 is secured to an archery bow.

Keyed socket 34 is machined into base mount 12. Referring to FIG. 8, keyed socket 34 includes a slot, or socket 36, and a key receiver 38 (shown in phantom). A neck 40, FIGS. 1, 8, and 9, is cut into base mount 12 from bottom surface 24 into socket 36. Neck 40 opens into channel 28 to provide open communication from bottom surface 24 into channel 28 in order to receive key pin 14. The diameter of socket 36 is slightly larger than the diameter of key pin 14 so that key pin 14 can be inserted into and past bottom surface 24 through neck 40 and into socket 36. A bevel 42 is machined into base mount 12 to facilitate the insertion of key pin 14 into socket 36.

Referring to FIG. 10, key receiver 38 is drilled through the wall of base mount 12 approximately 180° around the circumference of base mount 12. It is understood, however, that key receiver 38 may be drilled at other locations around the circumference of base mount 12 without departing from the spirit and scope of the present invention. Key receiver 38 differs from socket 36 in that key receiver 38 lacks neck 40. Instead, a segment 80 of base mount 12 separates key receiver 38 from bottom surface 24 of base mount 12.

The diameter of key receiver 38 is slightly larger than the diameter of key pin 14 so as to receive an end of key pin 14. In this manner, as will be discussed in greater detail below, one end of key pin 14 may be inserted through socket 36 into key receiver 38 so that the other end of key pin 14 rests in socket 36.

FIG. 11 is a view taken along line 11—11 of FIG. 9 in order to show the communication between channel 28, passage 30, socket 36, and key receiver 38 within base mount 12.

Referring back to FIG. 1, beveled washer 16 includes a center passage 60 through which mounting stud 20 is inserted. Beveled washer 16 is flat on one side 62 and includes a beveled surface 64 opposite flat side 62. Upon installation, beveled washer 16 is positioned on mounting stud 20 such that its flat side 62 is adjacent nut 18 while its beveled surface is directed toward key pin 14.

In the preferred embodiment, beveled washer 16 is a belleville washer available commercially; however, it is understood that other washers having a similar configuration, or even a washer having flat surfaces on both sides, could be substituted. As will be discussed in greater detail below, beveled surface 64 of beveled washer 16 mates a bevel 26 machined in channel 28 of base mount 12 adjacent bottom surface 24 and assists to properly align mounting stud 20 and thereby key pin 14 within keyed socket 34 of base mount 12 when beveled washer 16 is tightened against bevel 26 and bottom surface 24 when in the connected position (as shown in FIGS. 2 and 3).

As described above, nut 18 threads into mounting stud 20 between stabilizer 22 and beveled washer 16. Nut 18 includes a threaded bore 70 therein having threads which mate the threads of mounting stud 20. In the preferred embodiment, nut 18 is a hex nut; however, it is understood that other similar fasteners could be substituted provided the threads mate the threads of mounting stud 20. Nut 18 provides a locking surface on mounting stud 20 against which key pin 14 can be tightened so as to secure base mount 12 between beveled washer 16 and key pin 14 when in the connected position.

Mounting stud 20 is substantially a threaded rod of a predetermined length. The length of mounting stud 20 is dependent upon the desired application. In the preferred embodiment, mounting stud 20 of stabilizer 22 is an industry AMO standard for archery accessories. For this application AMO defines the standard for the thread series and length of mounting stud 20. However, it is understood that the length and thread series of mounting stud 20 could be modified as required by the desired application.

The rapid connect/disconnect system 10 of the present insertion is assembled by threading nut 18 onto mounting stud 20. Beveled washer 16 is then placed upon mounting stud 20 so that flat side 62 is adjacent nut 18. Mounting stud 20 is then inserted into stud aperture 50 of key pin 14, and key pin 14 is threaded onto mounting stud 20 such that a space or length of stud 20 is left between beveled washer 16 and key pin 14. Rapid connect/disconnect system 10 is now assembled to provide rapid connection/disconnection capability to allow stabilizer 22 to be quickly connected or disconnected from base mount 12.

As stated above, a first member, such as base mount 12, is secured to an object (such as a bow in the preferred embodiment) by inserting a socket head cap screw through passage 30 and into a bow. Once base mount 12 is secured, rapid connect/disconnect system 10 can be used to facilitate the connection of a second member, stabilizer 22 in the preferred embodiment, by interlocking key pin 14 into keyed socket 34 of base mount 12.

Key pin 14 is threaded onto mounting stud 20 as described above, such that its longitudinal axis is perpendicular to the longitudinal axis of the mounting stud 20. Key pin 14 is then inserted into keyed socket 34 and locked therein to secure stabilizer 22 to base mount 12. This is accomplished by inserting key pin 14 on mounting stud 20 into channel 28 (shown in phantom) past neck 40 and in socket 36. Once key pin 14 is inserted into socket 36, key pin 14 on mounting stud 20 is slid into key receiver 38.

Once key pin 14 on mounting stud 20 is properly inserted into keyed socket 34, mounting stud 20, and thereby stabilizer 22 of the preferred embodiment, is rotated so that key pin 14 is threaded toward nut 18. Beveled surface 64 of beveled washer 16 properly aligns key pin 14 into keyed socket 34 and seats into bevel 26 of base mount 12. Mounting stud 20 is rotated until beveled surface 64 of beveled washer 16 is tightened into bevel 26 against bottom surface 24 of base mount 12, and flat surface 62 is tightened against nut 18. The length of key pin 14 extending into key receiver 38 ensures that base mount 12 remains tightly pressed against beveled washer 16 so that stabilizer 22 remains secured to base mount 12, and thereby the bow. The amount of rotation of mounting stud 20 to secure stabilizer 22 to base mount 12 is approximately one and one-half (1½) revolutions.

In order to disconnect key pin 14 from base mount 12, mounting stud 20 is rotated approximately one and one half (1½) revolutions in the opposite direction so that key pin 14 is threaded away from nut 18. This separates beveled washer 16 from bottom surface 24 of base mount 12 so that key pin 14 can be slid out of key receiver 38, away from socket 36, past neck 40, and out of channel 28, thereby disconnecting stabilizer 22 from key pin 14 and the bow. A rapid connect/disconnect system is thereby provided.

Now referring to FIG. 2, which is a side view of the rapid connect/disconnect system 10 of the present invention in the connected position. FIG. 2 shows the relationship of base mount 12, key pin 14, mounting stud 20, beveled washer 16, and nut 18 in the connected, or locked position.

Referring to FIG. 3, a partial cut-away view taken along line 3—3 of FIG. 2, the relationship between base mount 12, key pin 14, mounting stud 20, beveled washer 16, and nut 18, is shown. Flat surface 62 of beveled washer 16 is shown abutting nut 18 so that its beveled surface 64 is pressed into bevel 26 of base mount 12 adjacent bottom surface 24, thereby properly aligning key pin 14 into socket 36. Key pin 14 is shown tightened against segment 80 of base mount 12 such that a gap 82 can be seen between key pin 14 and socket 36. In this manner key pin 14 ensures that stabilizer 22 is secured to base mount 12.

FIG. 3 also shows the relationship between mounting stud 20 and base mount 12. Since key pin 14 is threaded onto mounting stud 20, a segment of mounting stud 20 extends into channel 28 of base mount 12 when key pin 14 is secured in socket 36 in the connected position.

It is understood that base mount 12 could be configured in a plurality of shapes as required for a particular application. It is further understood that the shape of key pin 14, and thereby socket 36 and key receiver 38, could be altered provided that key pin 14 interlocks with socket 36 and key receiver 38 in keyed socket 34.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A connect/disconnect system, comprising:
   a mounting stud;
   a nut threaded onto said mounting stud;
   a key pin threaded onto said mounting stud such that a length of said mounting stud extends between said key pin and said nut;
   a base mount including a keyed socket having substantially the same geometric configuration as said key pin;
   said keyed socket being capable of receiving said key pin and interlock therewith such that when said base mount is rotated, said key pin also rotates but said mounting stud and said nut remain stationary;
   wherein when said key pin is threaded toward said nut along said mounting stud, said base mount is secured against said nut between said key pin and said nut.

2. The connect/disconnect system of claim 1 further including a washer positioned on said mounting stud between said key pin and said nut such that when said key pin is threaded toward said nut along said mounting stud, the washer is secured between said base mount and said nut.

3. The connect/disconnect system of claim 2 wherein said washer is beveled on one side.

4. A system for removably connecting a first member to a second member, comprising:

a threaded mounting stud having a first end and a second end wherein said mounting stud is adapted to be secured to the second member;

a nut secured onto said mounting stud adjacent said first end;

a washer positioned on said mounting stud adjacent said nut;

a key pin threaded onto said mounting stud adjacent said second end;

a base mount including a bottom surface and a keyed socket cut therein;

said keyed socket having the same geometric configuration as said key pin;

means adapted for securing said base mount to the first member;

said keyed socket being capable of receiving said key pin so that when said key pin is threaded toward said nut along said mounting stud, said base mount is secured directly against said washer between said key pin and said nut.

5. The system of claim 4 further including:

a bevel cut in the bottom surface of said base mount;

said washer including a first side and a second side;

said first side being flat and positioned adjacent said nut;

said second side being beveled to mate the bevel cut in said base mount.

* * * * *